United States Patent [19]

Lovrenich et al.

[11] Patent Number: 4,726,260

[45] Date of Patent: Feb. 23, 1988

[54] SHIFTABLE TRANSMISSION WITH ASSURED INPUT-OUTPUT RELATIONSHIP

[76] Inventors: Rodger T. Lovrenich, 209 Whispering Sands, Santa Teresa, N. Mex. 88008; John H. Brems, 2800 S. Ocean Blvd. Apt. 160, Boca Raton, Fla. 33432

[21] Appl. No.: 723,211

[22] Filed: Apr. 15, 1985

[51] Int. Cl.⁴ ................... B60K 41/18; B60K 20/10; F16H 3/22
[52] U.S. Cl. ......................................... 74/861; 74/335; 74/342; 408/9; 409/231
[58] Field of Search ................. 74/342, 344, 346, 341, 74/335, 861; 408/9, 124; 409/231

[56] References Cited

U.S. PATENT DOCUMENTS

| | | | |
|---|---|---|---|
| 2,911,841 | 11/1959 | Miller | 74/342 |
| 3,124,998 | 3/1964 | Raehrs | 409/231 |
| 3,429,224 | 2/1969 | Osburn | 409/231 |
| 3,631,945 | 1/1972 | Ollearo | 74/346 X |
| 3,893,371 | 7/1975 | Frazier | 409/231 X |
| 4,124,327 | 11/1978 | Yoshida et al. | 409/231 X |
| 4,443,137 | 4/1984 | Albrent et al. | 408/9 |
| 4,449,866 | 5/1984 | Lohenis | 408/9 |
| 4,540,318 | 9/1985 | Hornung et al. | 408/9 |

FOREIGN PATENT DOCUMENTS 1084455  9/1967  United Kingdom ............ 408/9

Primary Examiner—Dirk Wright
Attorney, Agent, or Firm—Barnes, Kisselle, Raisch, Choate, Whittemore & Hulbert

[57] ABSTRACT

A shiftable transmission drive with assured input-output relationship includes a drive motor-transmission mechanism wherein a drive motor drives an output shaft at different rates through a shiftable transmission, and wherein the output shaft is always connected with the drive motor through the shiftable transmission. The output shaft is thus always under control and its position precisely known. The shift position of the gears is known. Shifting is directed at predetermined positions by a microprocessor when the transmission is stopped or at low speeds of rotation. The drive is a direct drive or alternatively a gear ratioed drive.

3 Claims, 6 Drawing Figures

SHIFTABLE TRANSMISSION WITH ASSURED INPUT-OUTPUT RELATIONSHIP

The present invention relates to a drive motor-transmission arrangement wherein the precise rotary position of the motor shaft is continually determined and transmission shifting is accomplished only at predetermined rotational points under control of a microprocessor to avoid clashing of transmission gearing.

BACKGROUND OF THE INVENTION

In a motor driven device such as a machine tool, it is important to know precise locations so that accurate work can be accomplished in a rapid manner. This is particularly true in large, automated production lines wherein capital investment reaches many millions of dollars. Work must be done within close tolerances in a minimum amount of time.

Conventional equipment, using drive motors or clutches to an output shaft, suffers the disability of not knowing precisely where the motor or clutch stops and consequently not knowing the position of the output. Complicated, expensive control schemes are utilized in an attempt to accomplish this. If the position of the tool being driven cannot be accurately established, the work is out of tolerance and must be rejected. In automated, high production lines, seconds of time equate to many thousands of dollars so it is necessary to accomplish accurate work as quickly as possible.

The objective in automated machining is to rapidly move a tool, such as a drill for example, to a position as close as possible to the work piece. The movement of the tool must then be slowed to feed rate so as to engage the work piece in the feed mode. The changeover from rapid traverse to feed must occur at a precise, repeatable location or the tool will "slide over", slamming into the work piece with tool breakage and work piece destruction. If the shift point is backed off to insure against breakage, excessive "air cutting" time is introduced as the tool moves through the air at the feed rate.

The arrangement for linearly advancing and retracting a rotating shaft at two different speeds such as "rapid traverse" and "feed speed" in machine tools can be accomplished in various ways.

One approach uses two different electric motors, one for each mode. The two motor approach has good high speed capability and good high thrust against a stop. However, this approach has a very poor fast duty cycle capability; it has a high parasitic "air cutting" time; it cannot eliminate tool-breaking slide over; it is not versatile in that it cannot set speeds and feeds via a program; it is bulky and occupies excessive floor space; it cannot provide dual platen position verification for safety; and it has the disadvantage of mechanical braking and mechanical limit switches.

A second approach uses a single direct servo drive. This approach has low parasitic time; it eliminates slide over; it is versatile; and it contains no mechanical limit switches or mechanical cycling brake. It has good rapid traverse capability but its maximum thrust capability is poor and it does not have high thrust against a stop; it is bulky; it cannot perform dual platen position verification for safety; and it has a high electrical failure rate due to many electronic components.

A third approach uses a single servo motor with a fixed ratio shiftable transmission. It enables the use of a small motor such as two horsepower; its fast continuous duty cycle capability is good; it has low parasitic time; it eliminates mechanical limit switches and mechanical cycling brakes.

However, maximum rapid traverse capability and high feed thrust must be compromised one for the other according to the single gear ratios selected; dual platen position verification cannot be accomplished; and the electrical failure rate is moderate.

Best results are obtained with a single electric motor capable of moving in rotational increments in combination with a shiftable transmission. This can be an encoded a.c. or d.c motor or a stepper motor. Optimum results are obtained using the stepper motor with feed back of position. Of the systems discussed above, this arrangement has the fastest continuous duty cycle capability. It has low parasitic time; it eliminate slide over; it has good maximum thrust capability and continuous high thrust against a stop; it is versatile; it is compact; it eliminates mechanical limit switches and mechanical cycling brakes; and it has a low failure rate since it uses fewer electronic components.

In addition, the shiftable stepper motor system fails "stopped" so it is virtually "runaway proof". It provides a power-off holding brake with its permanent magnets. It requires a digital pulse train to cause rotation. Even if it takes one step more than desired, this is usually tatamount to a degree or two of rotation and very small linear movement of the machine lead screw shaft. The shiftable stepper motor system has the highest degree of possible computer diagnosis and has the lowest cost for communication interface.

SUMMARY OF THE INVENTION

An examplary embodiment of the present invention includes a drive motor controlled by a control mechanism that imparts incremental rotation through a shiftable transmission to an output shaft. The increments of rotation of the drive motor are continually counted by a counter so that the position of the output shaft is always determined. The gears in the transmission are selected for meshing at known positions of rotation and the drive motor is slowed or stopped at selected positions to permit shifting. The transmission has no neutral position. The relationship of the output shaft to the input shaft is maintained at all times during shifting.

DETAILED DESCRIPTION OF THE INVENTION

Figure 1:
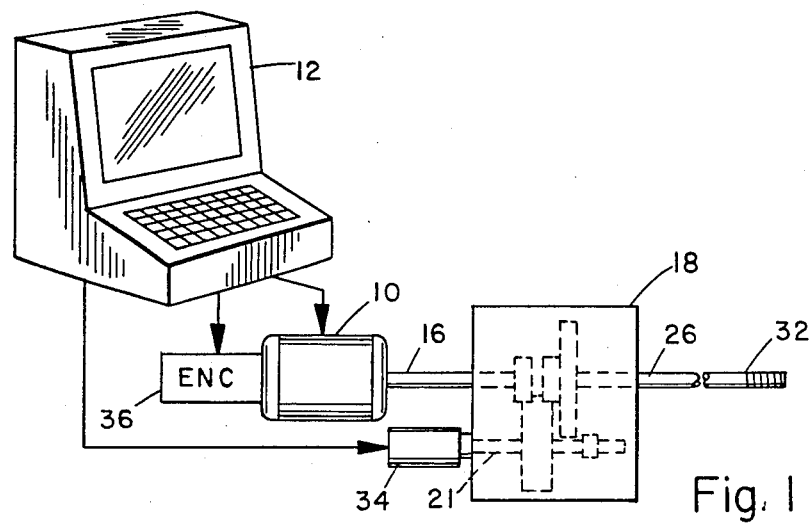
FIG. 1 is a schematic of a first embodiment of the invention with a drive motor-transmission mechanism using an encoder to determine motor shaft position.
Figure 2:
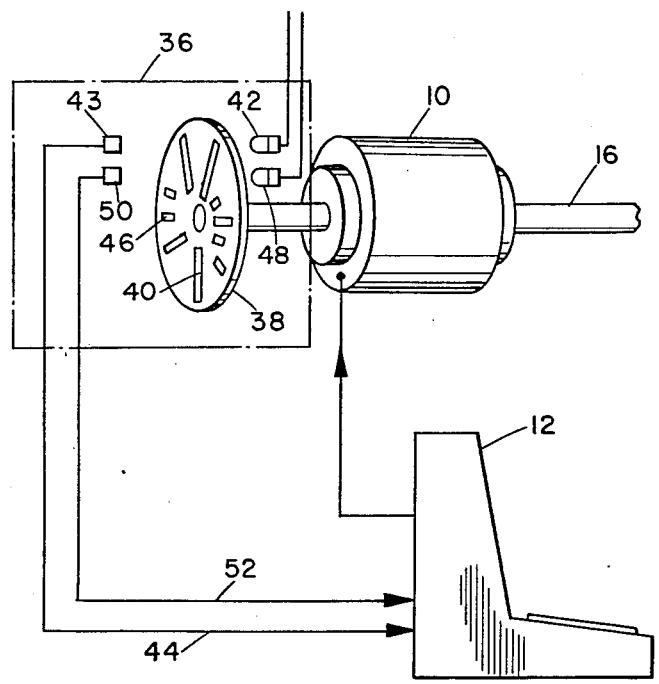
FIG. 2 is a schematic view demonstrating the operation of the encoder used in the drive motor-transmission mechanism of FIG. 1.

Referring to the drawings, a first embodiment of the present invention is shown in FIGS. 1-5. An electric drive motor is indicated at 10. The drive motor 10 is energized by microprocessor 12 that is electrically connected to the motor 10. The microprocessor may be a Zilog Z-80. The drive motor can be an electric incremental drive or continuous drive motor. Thus, energy is provided to rotate the shaft 16 of the drive motor 10.

Figure 3:
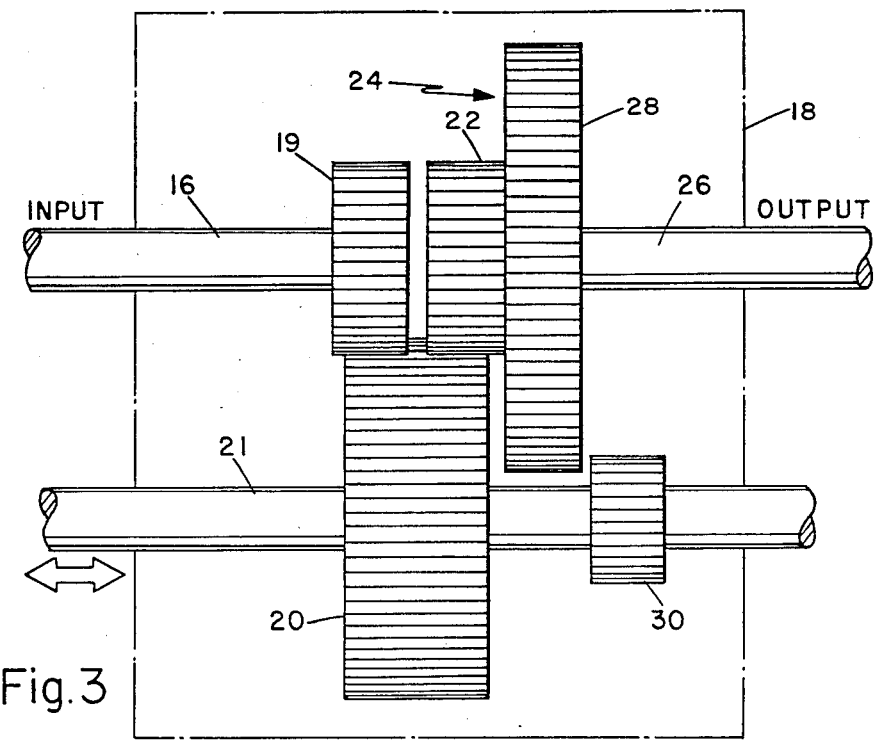
FIG. 3 is a partial view of the transmission of FIG. 1 showing the relative positions of the gears when the transmission is in the high speed condition.
Figure 4:
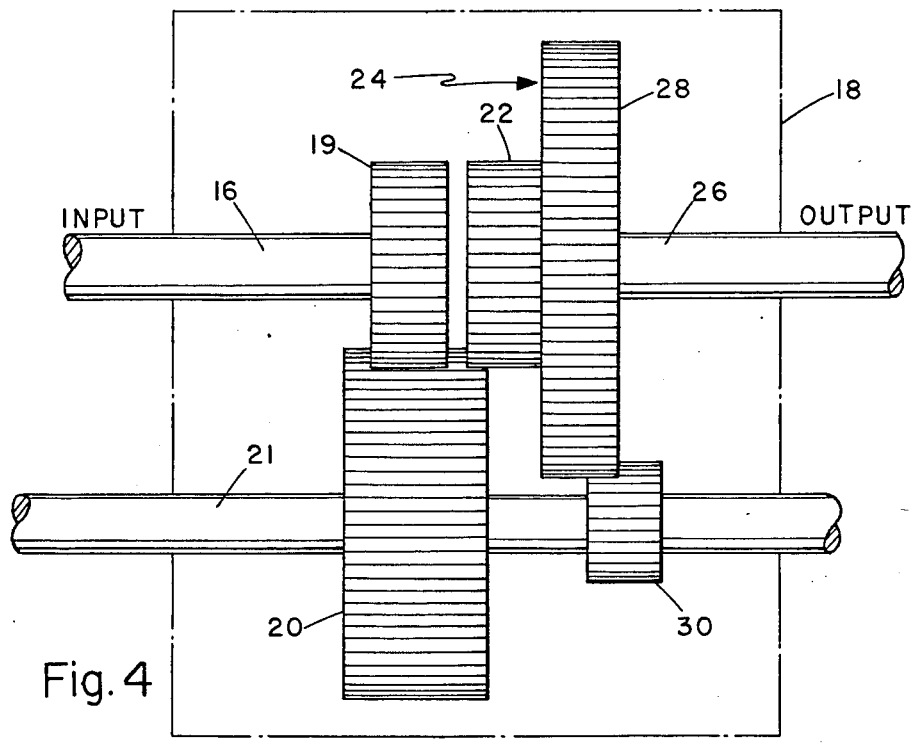
FIG. 4 is a partial view of the transmission of FIG. 1 showing the relative positions of the gears when the transmission is being shifted.
Figure 5:
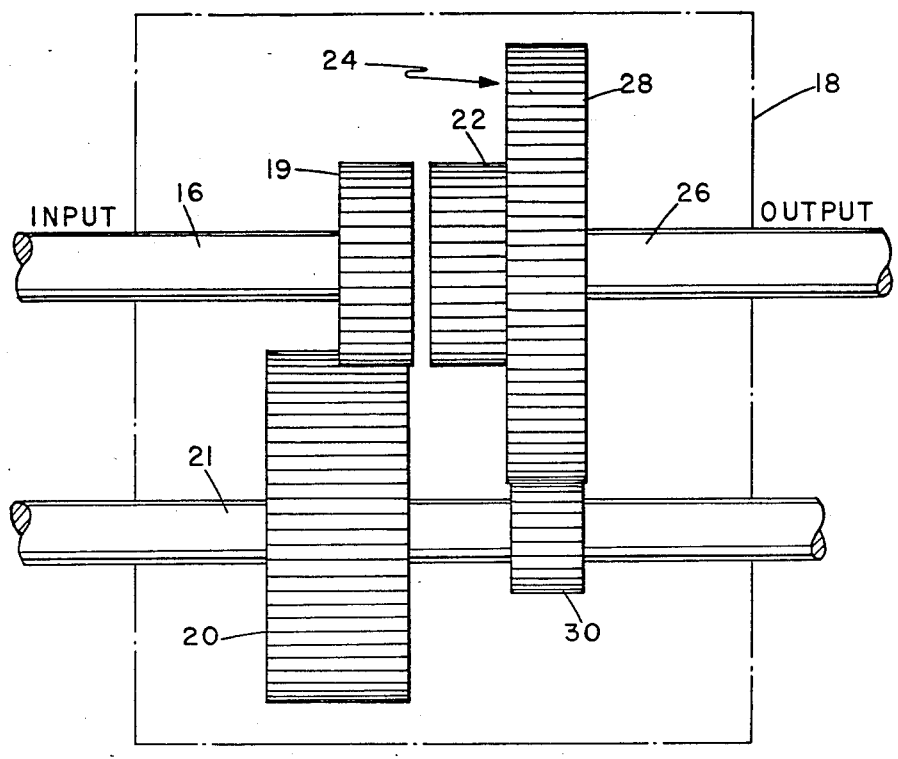
FIG. 5 is a partial view of the transmission of FIG. 1 showing the relative positions of the gears when the transmission is in the low speed condition.

The motor shaft 16 is connected with shiftable transmission 18 as shown in FIG. 1. The details of the transmission are shown in FIGS. 3, 4 and 5 which also show the various positions of the transmission. It is a spur gear transmission. However, other kinds of transmission can be used. FIG. 3 shows the high speed position of the transmission. The input shaft 16 has input gear 19 fixed thereon. Input gear 19 is engaged with gear 20. Gear 20 is fixed to shaft 21 which is shiftable as indicated by the two way arrow. Gear 20 is also engaged with gear 22. Gear 22 is part of a gear cluster 24 fixed to the end of the output shaft 26. Gear 28, which is also part of the gear cluster 24, is disengaged. Gear 30 is mounted on shaft 21 and is disengaged. In this embodiment gears 19 and 22 have the same number of teeth so there is a one to one ratio between the input shaft 16 and the output shaft 26. This could be the rapid traverse condition of the slide in a machine tool for example with the transmission output shaft 26 connected with a worm shaft 32 (FIG. 1) of a typical ball lead screw of the machine tool.

When the motor has completed its rotation in the rapid traverse mode for the desired linear distance of the tool provided by the output shaft 26 and the ball lead screw 32, shifting must take place to move the transmission into the low speed or feed condition. This means that the shaft 21 must be shifted to the left from the high speed position shown in FIG. 3 to the position shown in FIG. 5.

This is accomplished by stopping the motor and issuing the command from the microprocessor 12 to the solenoid 34 (FIG. 1). When this takes place, the shaft 12 moves to the left. As shown in FIG. 4, gear 20 is engaged with gear 22 and gear 30 is engaged with gear 28. The input shaft 16 does not lose track of the output shaft 26 during shifting.

As the shaft 21 moves further to the left to the position shown in FIG. 5, gear 22 is disengaged from gear 20. The drive is now through gears 19, 20, 30 and 28 in the low speed position. After the desired amount of rotation, the motor is stopped and the solenoid 34 is energized to shift the shaft 21 back through the position shown in FIG. 4 to the position shown in FIG. 3.

The gears can be shifted at certain points in their rotation. In order to shift at the proper points, the increments of rotation of the motor shaft 16 are counted by an encoder 36 and fed back to the microprocessor 12. A typical encoder is Model H25D-SB-200-AB-7406R-TB-5 produced by the Industrial Encoder Division of BEI Electronics Inc. of Goleta, Calif. The operation of the encoder is demonstrated schematically in FIG. 2. A light wheel 38 is connected to the motor shaft 16 and includes 200 slots 40 representing the increments of rotation for example. These slots permit counting of the increments of rotation of the drive motor 10 by light source 42 shining through the slots 40 and impacting photo transistor 43. These increment count pulses are fed to the microprocessor 12 through line 44 and the microprocessor counts these pulses. Eight other slots 46 are located at the proper shift points of the transmission when the gears are aligned for shifting. The microprocessor 12 will initiate shifting only when one of these slots passes light between light source 48 and photo transistor 50. This information is transferred on line 52 to the microprocessor 12.

Figure 6:
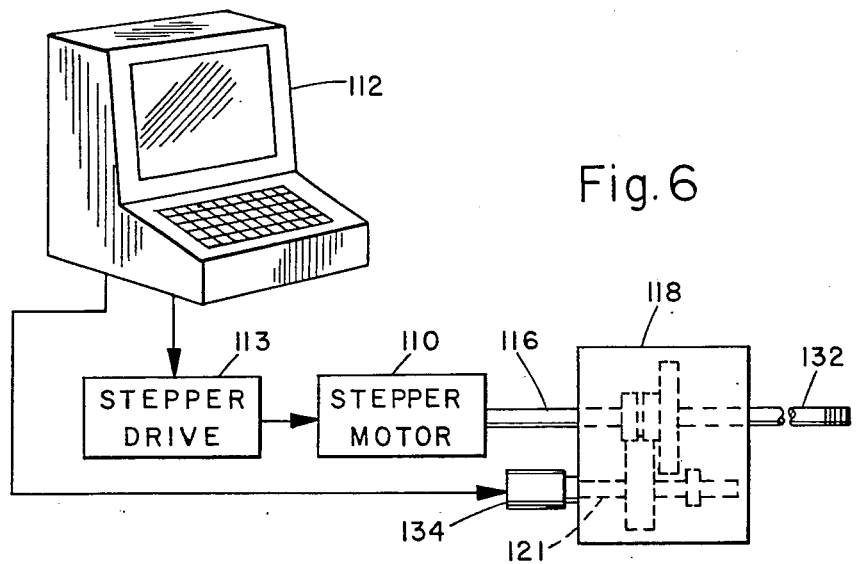
FIG. 6 is a schematic view of a second embodiment of the present invention employing an incremental drive motor such as a stepper motor.

A second embodiment of the present invention is shown in FIG. 6 using an incremental drive motor such as a stepper motor for example. These motors are provided by Septor Electronics Corp. of El Paso, Tex. and Superior Electric Corp. of Bristol, Conn. Microprocessor 112 is electrically connected to stepper drive 113 which may be a Sigma Stepper for example. Stepper drive 113 is connected to stepper motor 110. Stepper motor 110 drives the transmission through motor shaft 116. This drive is accomplished as shown in FIGS. 3, 4 and 5. The transmission 118 includes ball lead screw shaft 132. The microprocessor 112 controls solenoid 134 to do the shifting with shiftable shaft 121. A program is entered into the computer to accomplish the desired task which may be, for example, take 2060 steps in rapid advance, stop, shift, take 630 steps at feed speed, and return 2090 steps to the initial position.

It will be apparent that with the device of the present invention, control of the ball lead screw is never lost but is continually maintained even during shifting. The increments of motor shaft rotation always indicate the precise position of the ball lead screw. The microprocessor keeps track of the gear it is in and how many increments of rotation have occurred in each gear ratio. Thus, in a typical example, the microprocessor has the duty to keep track of the steps in the high speed mode (rapid traverse) and the steps in the low speed mode (feed speed) for a determination of the total linear position of the machine slide. The output always has a relationship to the drive motor.

The transmission changes to the mechanical ratio between the input shaft and output shaft while never losing known angular relationship between the driving and driven members. This is far different from the use of a conventional motor or clutch arrangement wherein one cannot tell where the output device stops and begins. Tests show that the window for returning to the starting position on a conventional clutch drive is 382 mils. In the device of the present invention, the window is six mils. The pulses of the stepper motor provide a very accurate indication of the output position. The transmission is positive and easily shiftable.

Having thus described our invention, we claim:

1. A shiftable transmission motor drive arrangement comprising a drive motor having an output shaft, transmission means coupling said motor output shaft to a load, means for shifting said transmission so as to obtain predetermined drive ratios between said shaft and said load, control means coupled to said motor and said shifting means controlling motion at said load, and an encoder including a disc coupled to said shaft for rotation about a disc axis, said encoder including said disc having separate first and second circumferential arrays of signal generating means spaced from each other radially of said disc axis for respectively providing first signals indicative of increments of shaft rotation and second signals separate from said first signals at predetermined rotational positions of said shaft at which said transmission can be shifted, said control means being responsive to said second signals for actuating said shifting means only at said predetermined rotational positions.

2. The arrangement set forth in claim 1 wherein said transmission means is constructed and arranged such that said shaft remains directly coupled to said load during shifting of said transmission means whereby said control means retains accurate indication of position of said load.

3. The arrangement set forth in claim 2 wherein said transmission means comprises an input gear on said shaft, a shift mechanism including a first transfer gear on a rotatable linearly shiftable transfer shaft and a second gear on said transfer shaft, and an output gear cluster on an output shaft coupled to said load and having first and second output gears with differing gear ratios thereon, said shifting means being coupled to said transfer shaft for moving said shaft axially between driving engagement with said first and second output gears.

* * * * *